No. 739,432. PATENTED SEPT. 22, 1903.
J. W. MADIGIN.
TERMINAL FOR STORAGE BATTERIES.
APPLICATION FILED JAN. 10, 1903.
NO MODEL.
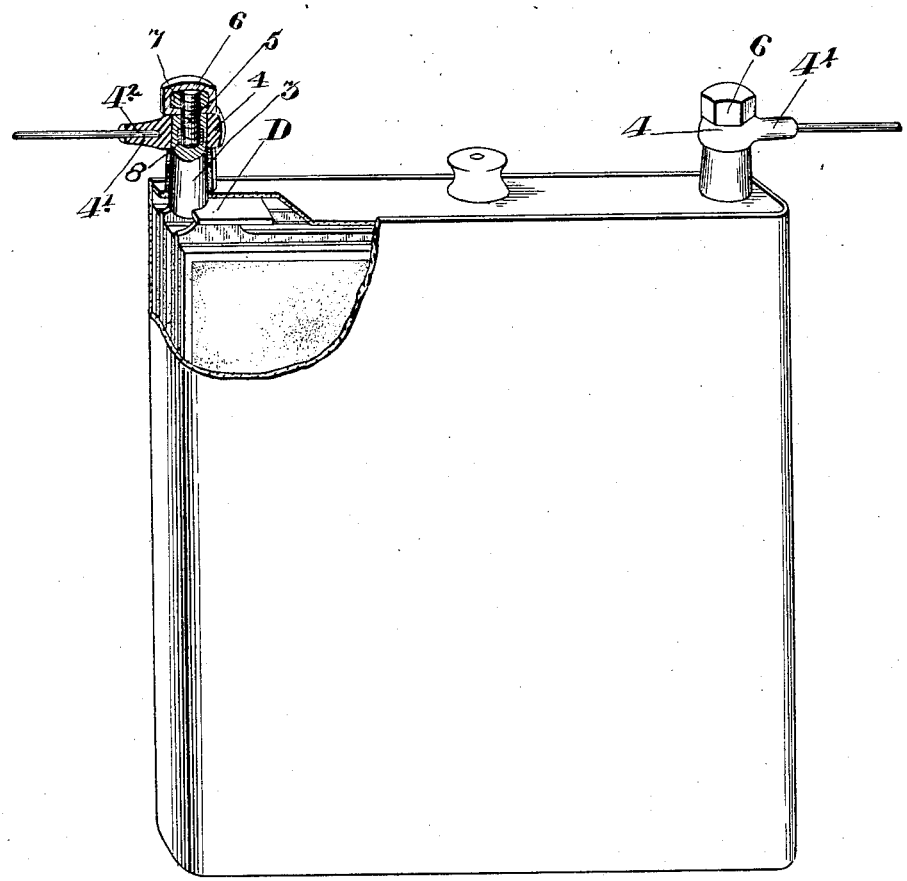
Witnesses
R. Shields
G. L. Bate
Inventor
J. W. Madigin
by Fetherstonhaugh & Co
attys.

No. 739,432. Patented September 22, 1903.

UNITED STATES PATENT OFFICE.

JACOB WILFRID MADIGIN, OF TORONTO, CANADA.

TERMINAL FOR STORAGE BATTERIES.

SPECIFICATION forming part of Letters Patent No. 739,432, dated September 22, 1903.

Application filed January 10, 1903. Serial No. 138,517. (No model.)

*To all whom it may concern:*

Be it known that I, JACOB WILFRID MADIGIN, of the city of Toronto, in the county of York, in the Province of Ontario, Canada, have invented certain new and useful Improvements in Electrical Terminals for Storage Batteries, of which the following is a specification.

My invention relates to improvements in electrical terminals for storage batteries; and the object of the invention is to provide a simple non-corrodible connection of low resistance, which will not be liable to sulfating and whereby any single cell or set of cells may be removed from the group expeditiously without destroying the connection; and it consists, essentially, of a tapered terminal suitably connected to the positive or negative bar and made of lead or other suitable metal having a like quality, a sleeve or ring having a stem or offset in which the end of the terminal wire is cast, a bolt of a comparatively hard metal to the terminal, such as iron, suitably cast in the upper end of the terminal, and a nut of lead or other metal of a like quality having cast therein a hard-metal nut, such nut being designed to hold the sleeve or ring in place, as hereinafter more particularly explained.

The drawing represents a perspective view of a storage or secondary battery with portion of the same and the terminal broken away and in section to exhibit the construction of the terminal.

3 is the post of the terminal, which is made tapered and is attached to or forms part of the bar D of the electrode or connected electrodes.

4 is the sleeve or ring, which has a stem 4', in which is suitably cast the end of the wire $4^2$ when the sleeve is being cast. The ring fits on the upper end of the tapered post 3, as indicated.

5 is a bolt which is also cast along with the post 3. This is a nut which is made of lead and contains within the same a hard-metal nut 7, such as iron. It will be noticed that the nut 6 entirely surrounds the nut 7 and that such nut 6 when screwed home abuts the top of the post 3, and thereby holds the ring 4 in place without any of the iron either of the bolt or internal nut being exposed. It will thus be seen that there will be no danger of the electrolyte or fumes of the electrode coming in contact with any of the connections in a terminal made as I describe, and consequently there will be no danger of sulfating.

A sleeve 8 is arranged around the lower end of the bolt 5. The said sleeve is in the form of an elastic band and is to prevent the action of the electrolyte going up toward the terminal and is a further preventive against sulfating.

What I claim as my invention is—

1. In a storage or secondary battery a terminal for the electrode comprising a lead or non-sulfating binding-post, a sleeve fitting thereon and having located in one of the projections thereof one of the terminal wires, and non-sulfating means for holding the sleeve in position on the post whereby none of the parts liable to sulfate are left exposed as and for the purpose specified.

2. In a storage or secondary battery a terminal for the electrode comprising a lead or non-sulfating binding-post, a sleeve fitting thereon and having located in one of the projections thereof one of the terminal wires, and a lead or non-sulfating cap secured to the top of the post and designed to hold the sleeve in position as and for the purpose specified.

3. In a storage or secondary battery a terminal for the electrodes comprising a lead or non-sulfating binding-post, a sleeve fitting thereon and having located in one of the projections thereof one of the terminal wires, a metal screw extending into and upwardly from the post and a hard-metal nut encompassed with lead and designed to be screwed onto the metal screw, so as to closely abut the top of the sleeve and post as and for the purpose specified.

4. In a storage battery a terminal for the electrode comprising a non-sulfating binding-post, a sleeve fitting thereon and attached to one of the terminal wires, a metal screw extending into the binding-post, a nut on a screw holding the sleeve in place and a sleeve around the lower end of the screw, substantially as described.

JACOB WILFRID MADIGIN.

Witnesses:
M. McLAREN,
B. BOYD.